(12) United States Patent
Tsukahara et al.

(10) Patent No.: US 8,897,662 B2
(45) Date of Patent: Nov. 25, 2014

(54) IMAGE FORMING APPARATUS AND IMAGE FORMING METHOD

(71) Applicants: Mina Tsukahara, Kanagawa (JP); Takashi Soyama, Kanagawa (JP); Yohsuke Utoh, Kanagawa (JP)

(72) Inventors: Mina Tsukahara, Kanagawa (JP); Takashi Soyama, Kanagawa (JP); Yohsuke Utoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 60 days.

(21) Appl. No.: 13/684,907

(22) Filed: Nov. 26, 2012

(65) Prior Publication Data

US 2013/0156457 A1    Jun. 20, 2013

(30) Foreign Application Priority Data

Dec. 16, 2011   (JP) ................. 2011-276154

(51) Int. Cl.
| | | |
|---|---|---|
| G06F 1/32 | (2006.01) | |
| H04N 1/00 | (2006.01) | |
| G03G 15/00 | (2006.01) | |
| H04N 1/32 | (2006.01) | |

(52) U.S. Cl.
CPC ........ G03G 15/80 (2013.01); *H04N 2201/3204* (2013.01); G06F 1/3287 (2013.01); *Y02B 60/1267* (2013.01); *H04N 2201/3274* (2013.01); *H04N 1/32122* (2013.01); *H04N 2201/0082* (2013.01); H04N 1/00896 (2013.01); H04N 1/00928 (2013.01); *G06F 1/325* (2013.01)
USPC ............................................. 399/75; 399/88

(58) Field of Classification Search
USPC ......................................................... 399/75
See application file for complete search history.

(56) References Cited

U.S. PATENT DOCUMENTS

| | | | |
|---|---|---|---|
| 2007/0236734 A1 | 10/2007 | Okamoto | |
| 2009/0235102 A1* | 9/2009 | Koshika et al. | ............... 713/324 |
| 2010/0238507 A1 | 9/2010 | Matsushima et al. | |
| 2011/0004776 A1 | 1/2011 | Tanaka | |

FOREIGN PATENT DOCUMENTS

| | | |
|---|---|---|
| JP | 2004-333913 A | 11/2004 |
| JP | 2011-028727 | 2/2011 |

OTHER PUBLICATIONS

Extended European Search Report issued Oct. 11, 2013 in European Patent Application No. 12194461.5.
U.S. Appl. No. 13/682,473, filed Nov. 20, 2012, Utoh, et al.

* cited by examiner

*Primary Examiner* — Clayton E Laballe
*Assistant Examiner* — Jas Sanghera
(74) *Attorney, Agent, or Firm* — Oblon, Spivak, McClelland, Maier & Neustadt, L.L.P.

(57) ABSTRACT

An image forming apparatus includes an engine configured to perform image formation; an engine control unit configured to control the engine; an apparatus control unit configured to control the whole of the apparatus; a storage unit; and a state management unit configured to set the apparatus to a power-saving mode in which the apparatus control unit and the storage unit are supplied with power while the engine, and the engine control unit are not supplied with power when a main power supply is turned on. When the apparatus is set to the power-saving mode, the apparatus control unit reads out second engine information that represents a configuration of the engine from the storage unit and performs a start-up process on the apparatus control unit on the basis of the second engine information.

18 Claims, 6 Drawing Sheets

IMAGE FORMING APPARATUS AND IMAGE FORMING METHOD

CROSS-REFERENCE TO RELATED APPLICATION

The present application claims priority to and incorporates by reference the entire contents of Japanese Patent Application No. 2011-276154 filed in Japan on Dec. 16, 2011.

BACKGROUND OF THE INVENTION

1. Field of the Invention

The present invention relates to an image forming apparatus and an image forming method.

2. Description of the Related Art

An image forming apparatus includes an engine that performs operations involving image formation, a controller that controls the whole of the apparatus, and an operation and display unit as a user interface. In order to operate the image forming apparatus, the engine, the controller, and the operation and display unit have to be all energized. However, in order to reduce power consumption of the image forming apparatus, supplying power to the image forming apparatus should be suppressed when a user does not use the image forming apparatus.

For example, in Japanese Patent Application Laid-open No. 2011-28727, a technology to suppress the power consumption of a multifunction peripheral (MFP), which has a plurality of functions, by controlling power supplying for each processing unit to supply power only to a necessary part for processing, is disclosed.

However, in the related art, a power consumption reduction method for the image forming apparatus has been known in which after the main power supply of the image forming apparatus is once turned on and the engine, the controller, and the operation and display unit are then energized, power supply to unnecessary parts is stopped. This means that, after the main power supply of the image forming apparatus is turned on, the engine, the controller, and the operation and display unit are energized even if the user does not use the image forming apparatus, whereby unnecessary power is consumed.

In addition, recently, some image forming apparatuses automatically control on and off of the main power supply. In such an apparatus, after the main power supply is automatically turned on, unnecessary power is consumed if the user does not use the apparatus.

Therefore, there is a need for an image forming apparatus and an image forming method capable of reducing the power consumption of the image forming apparatus.

SUMMARY OF THE INVENTION

It is an object of the present invention to at least partially solve the problems in the conventional technology.

According to an embodiment, there is provided an image forming apparatus for forming an image includes an engine configured to perform an operation involving image formation; an engine control unit configured to control the engine; a first storage unit configured to be accessible by the engine control unit and store therein first engine information that represents a configuration of the engine; an apparatus control unit configured to control the whole of the image forming apparatus; a second storage unit configured to be accessible by the apparatus control unit and store therein second engine information that represents a configuration of the engine; and a state management unit configured to set the image forming apparatus to a power-saving mode in which the apparatus control unit and the second storage unit are supplied with power while the engine, the engine control unit, and the first storage unit are not supplied with power when a main power supply that supplies the power is turned on. When the image forming apparatus is set to the power-saving mode, the apparatus control unit reads out the second engine information stored in the second storage unit and runs an application involving image formation on the basis of the second engine information to perform a start-up process on the apparatus control unit.

According to another embodiment, there is provided an image forming method is performed in an image forming apparatus that includes an engine configured to perform an operation involving image formation, an engine control unit configured to control the engine, a first storage unit configured to be accessible by the engine control unit and store therein first engine information that represents a configuration of the engine, an apparatus control unit configured to control the whole of the image forming apparatus, and a second storage unit configured to be accessible by the apparatus control unit and store therein second engine information that represents a configuration of the engine. The image forming method includes setting the image forming apparatus to a power-saving mode in which the apparatus control unit and the second storage unit are supplied with power while the engine, the engine control unit, and the first storage unit are not supplied with power when a main power supply that supplies the power is turned on; and reading out, when the image forming apparatus is set to the power-saving mode, the second engine information stored in the second storage unit; and running an application involving image formation on the basis of the read second engine information to perform a start-up process on the apparatus control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating a process performed when the image forming apparatus is automatically turned on;

DETAILED DESCRIPTION OF THE PREFERRED EMBODIMENTS

An embodiment of an image forming apparatus and an image forming method will be described in detail below with reference to the accompanying drawings.

Figure 1:
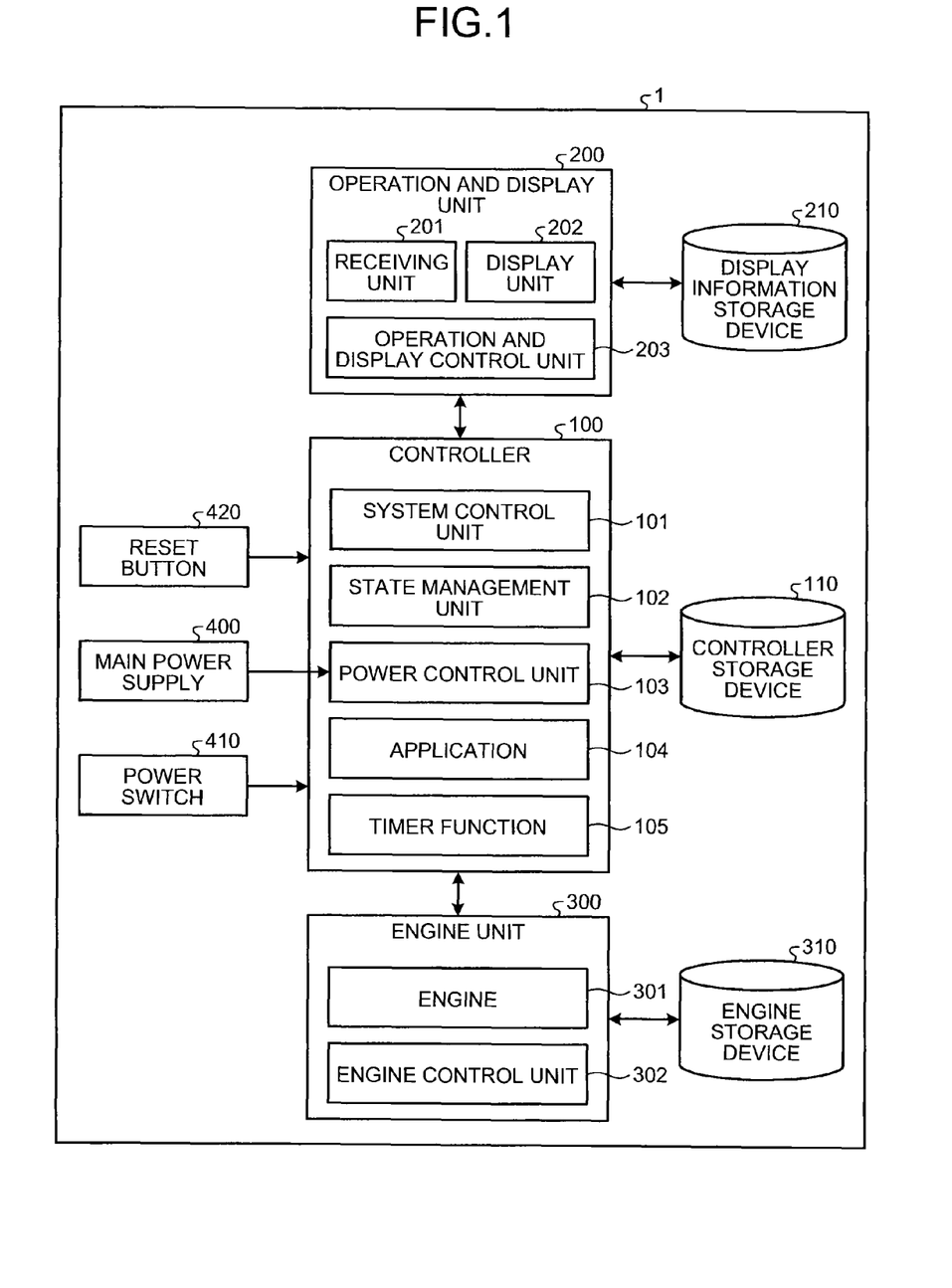
FIG. 1 is a block diagram illustrating a configuration of an image forming apparatus according to an embodiment.

FIG. 1 is a block diagram illustrating a configuration of an image forming apparatus 1 according to the embodiment of the present invention. The image forming apparatus 1 includes a controller 100, a controller storage device 110, an operation and display unit 200, a display information storage device 210, an engine unit 300, an engine storage device 310, a main power supply 400 that supplies utility power to the units and other parts of the image forming apparatus 1, a power switch 410 that receives an input to turn on or off the main power supply 400, and a reset button 420.

The controller 100 controls the whole of the image forming apparatus 1. The controller storage device 110 stores therein various types of information referred to by the controller 100. The controller storage device 110 is accessed that reads out or writes on the information stored in the controller storage device 110 by the controller 100. The controller storage device 110 stores therein controller information referred to by the controller 100 when performing a process on itself, such as running an application 104. Examples of the controller information are a model name or a serial number of the image forming apparatus 1, and the version information of the application 104.

The operation and display unit 200 is a user interface such as a touch panel or hard keys provided on a housing of the image forming apparatus 1. The display information storage device 210 is accessed by the operation and display unit 200 that reads out or writes on the information stored in the display information storage device 210. The display information storage device 210 stores therein display information referred to by the operation and display unit 200 when displaying information on a display unit 202. An example of the display information is language information.

The engine unit 300 performs operations involving image formation. The engine storage device 310 is accessed by the engine unit 300 that reads out or writes on the information stored in the engine storage device 310. An engine 301 included in the engine unit 300 is a plotter or a scanner, for example. The engine storage device 310 stores therein engine information such as a configuration of the engine 301. Examples of the engine information are the version of engine software, information related to a plotter engine such as a tray type or a finisher type, or information relating to a scanner engine such as a possible magnification/reduction rate or an image resolution.

The controller 100 includes a system control unit (apparatus control unit) 101, a state management unit 102, a power control unit 103, an application 104, and a timer function 105.

The system control unit 101 controls the whole of the image forming apparatus 1. For example, the system control unit 101 performs start-up process on the controller 100 when the main power supply 400 is turned on. The system control unit 101 also controls a start-up process on the operation and display unit 200 and the engine unit 300. The system control unit 101 further accesses the controller storage device 110. The state management unit 102 manages the power state of the image forming apparatus 1.

The power state of the image forming apparatus 1 has two modes: a normal mode and a power-saving mode. In the normal mode, the main power supply 400 supplies power to the units and other parts of the image forming apparatus 1. In the power-saving mode, the main power supply 400 supplies power to only some units and parts of the image forming apparatus 1. Specifically, in the present embodiment, in the power-saving mode, power is not supplied to the operation and display unit 200, the display information storage device 210, the engine unit 300, and the engine storage device 310. In the power-saving mode, the power consumption of the image forming apparatus 1 is thus lower than in the normal mode. Therefore, in the image forming apparatus 1, the power consumption can be reduced by setting the apparatus to the power-saving mode during the time period when the user does not actually use the image forming apparatus 1, for example.

The power control unit 103 controls on and off of the power supply to the units and other parts of the image forming apparatus 1 from the main power supply 400, on the basis of the power state of the image forming apparatus 1 that has been set by the state management unit 102. Specifically, when the power state has been set to the normal mode by the state management unit 102, the power control unit 103 controls the main power supply 400 to supply power to the operation and display unit 200, the display information storage device 210, the controller 100, the controller storage device 110, the engine unit 300, the engine storage device 310, for example, in the image forming apparatus 1.

On the other hand, when the power state has been set to the power-saving mode by the state management unit 102, the power control unit 103 controls the main power supply 400 to supply power to the controller 100 and the controller storage device 110, while controlling the main power supply 400 to stop supplying power to the operation and display unit 200, the display information storage device 210, the engine unit 300, and the engine storage device 310.

The reset button 420 is a hard key, for example, provided on the image forming apparatus 1. The power control unit 103 supplies power to the reset button 420 even in the power-saving mode. When the user presses down the reset button 420 in the power-saving mode, the state management unit 102 receives a reset instruction for returning from the power-saving mode to the normal mode.

The application 104 is, for example, a print application or a scanner application. The controller 100 has a plurality of software applications that are executable by the engine unit 300. The application 104 also instructs the engine unit 300 to perform appropriate operations.

In order for the application 104 to perform a certain process, the controller information, the engine information, or the display information is required as necessary. The application 104 obtains necessary information through the system control unit 101. For example, when the application 104 needs the controller information, the system control unit 101 reads out the controller information from the controller storage device 110 and outputs the controller information to the application 104. When the application 104 needs the engine information, the system control unit 101 obtains the engine information from the engine unit 300 and outputs the engine information to the application 104. Likewise, when the application 104 needs the display information, the system control unit 101 obtains the display information from the operation and display unit 200 and outputs the display information to the application 104. A single or a plurality of applications may be included in the controller 100.

The timer function 105 stores therein a power-on time to turn on the main power supply 400. The timer function 105 measures time to detect the power-on time. After the timer function 105 detects the power-on time, the power control unit 103 turns on the main power supply 400 and the state management unit 102 sets the power state to the power-saving mode. The timer function 105 operates with a secondary battery, for example, that uses power from other than the main power supply, and thus operates even when the main power supply 400 is turned off.

As described above, the image forming apparatus 1 according to the embodiment has the timer function to automatically turn on the main power supply 400 at a predetermined time.

However, some users do not use the image forming apparatus 1 immediately after the main power supply 400 is automatically turned on. In the embodiment, after the main power supply 400 of the image forming apparatus 1 is automatically turned on using the timer function, the power state is set to the power-saving mode. As a result, unnecessary power consumption of the image forming apparatus 1 can be reduced.

The power switch 410 receives an instruction from the user for turning the power on or off. After the power switch 410 is turned on or off, information that represents the power is on or off is output to the controller 100. After the system control unit 101 of the controller 100 obtains information that represents the power is off from the power switch 410, the system control unit 101 writes the display information that has been obtained from the display information storage device 210 through the operation and display unit 200 to the controller storage device 110. In the same manner, the system control unit 101 writes the engine information that has been obtained from the engine storage device 310 through the engine unit 300 to the controller storage device 110.

The operation and display unit 200 includes a receiving unit 201, the display unit 202, and an operation and display control unit 203. The receiving unit 201 receives information that has been input by the user using the touch panel or the hard keys, for example. The display unit 202 displays various display information. The operation and display control unit 203 controls the whole of the operation and display unit 200. The operation and display control unit 203 also accesses the display information storage device 210.

The engine unit 300 includes the engine 301 and an engine control unit 302. The engine 301 is a driving unit that actually performs operations involving image formation. The engine control unit 302 controls operations of the engine 301. The engine control unit 302 also accesses the engine storage device 310.

Figure 2:
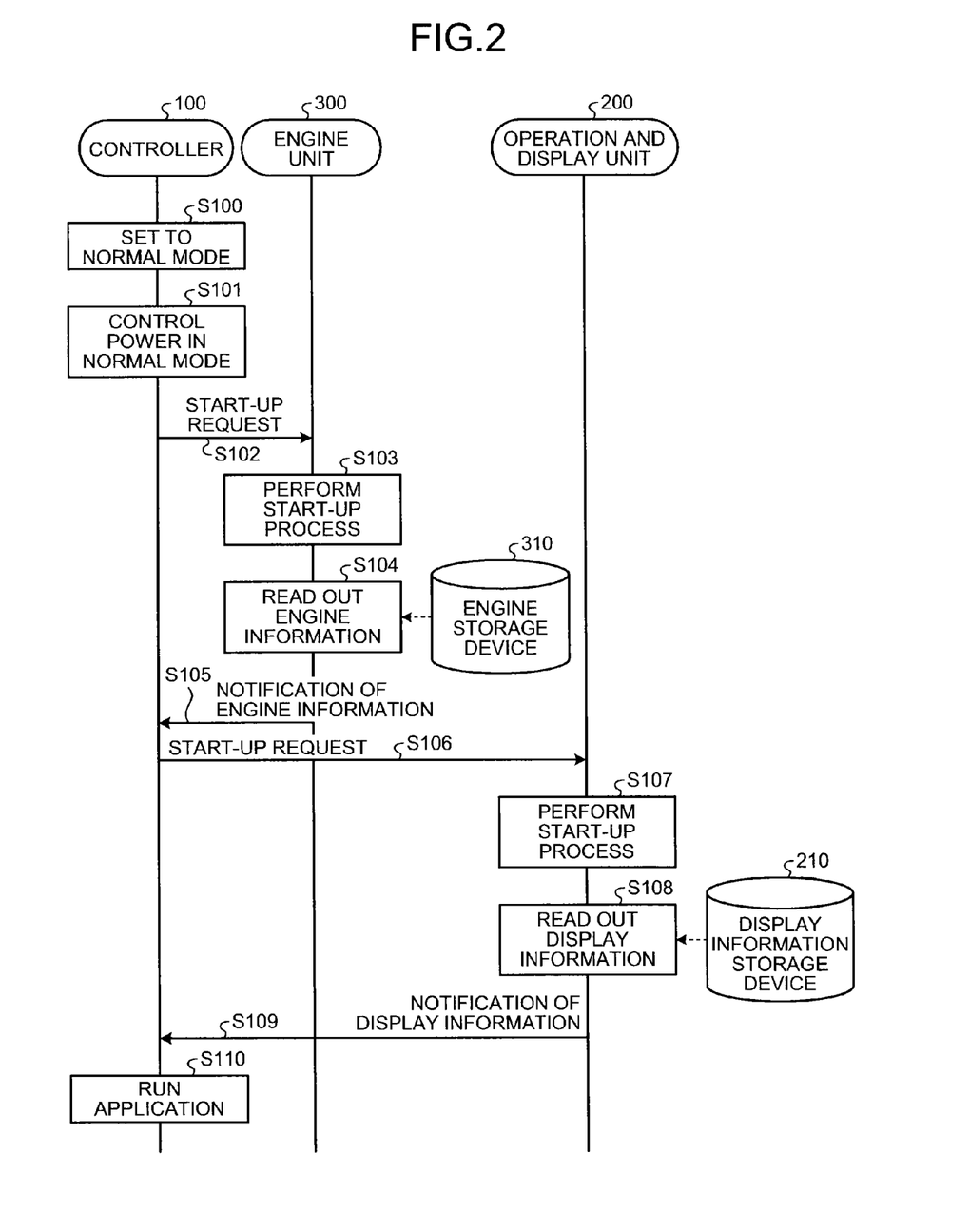
FIG. 2 is a sequence diagram illustrating a process performed when an operation state of the image forming apparatus is set to a normal mode.

FIG. 2 is a sequence diagram illustrating the normal mode process performed when the operation state of the image forming apparatus 1 is set to the normal mode. The normal mode is set when the user presses down the main power switch 410 to turn on the power manually, or when the user presses down the reset button 420 to return to the normal mode from the power-saving mode, for example.

After the main power supply 400 is turned on, the state management unit 102 sets the power state of the image forming apparatus 1 to the normal mode (Step S100). After the power state is set to the normal mode, the power control unit 103 performs power control in the normal mode (Step S101). Specifically, the power control unit 103 supplies utility power to the units and other parts in the image forming apparatus 1.

Subsequently, the system control unit 101 outputs a start-up request to the engine unit 300 (Step S102). After the engine control unit 302 in the engine unit 300 obtains the start-up request, the engine control unit 302 performs start-up process (Step S103). The engine control unit 302 also reads out the engine information from the engine storage device 310 (Step S104) and then notifies the system control unit 101 of the engine information that has been read out (Step S105).

In addition, the system control unit 101 outputs the start-up request to the operation and display unit 200 (Step S106). After the operation and display control unit 203 of the operation and display unit 200 obtains the start-up request, the operation and display control unit 203 performs a start-up process on the operation and display unit 200 (Step S107). The operation and display control unit 203 also reads out the display information from the display information storage device 210 (Step S108) and then notifies the system control unit 101 of the display information that has been read out (Step S109).

Subsequently, the application 104 refers to required information out of the engine information obtained at Step S105, the display information obtained at Step S108, and the controller information stored in the controller storage device 110, and performs a process based thereon (Step S110). The controller information is read out by the system control unit 101 and the application 104 obtains the controller information through the system control unit 101.

As described above, in the normal mode, the application 104 performs a process with reference to the information stored in the controller storage device 110 that is accessible by the controller 100 and required information out of the information stored in the engine storage device 310 accessed by the engine unit 300 and the information stored in the display information storage device 210 accessed by the operation and display unit 200.

The sequence to perform a process to obtain the engine information from the engine storage device 310 (Steps S102 to S105) and a process to obtain the display information from the display information storage device 210 (Steps S106 to S109) is not limited to the embodiment. Each process may be performed separately, otherwise, the process to obtain the display information may be performed at first. Furthermore, the process to obtain the engine information and the process to obtain the display information may be performed concurrently.

Figure 3:
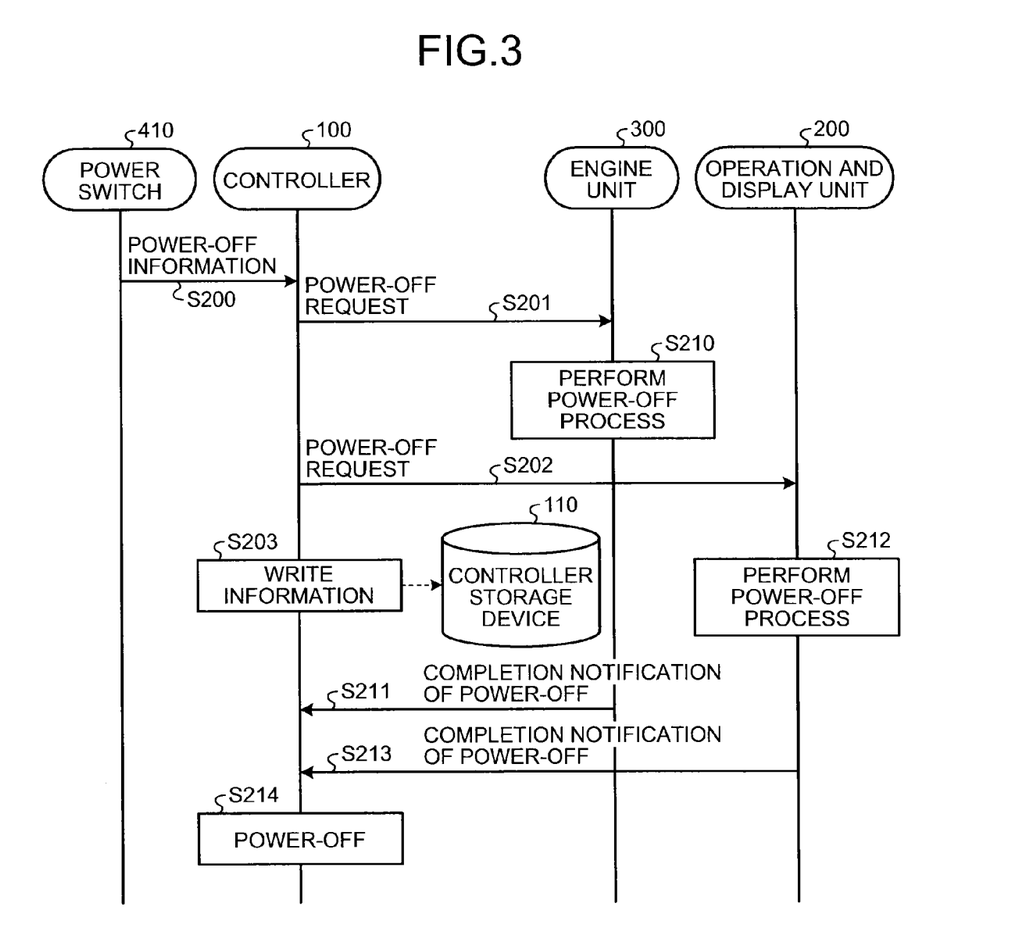
FIG. 3 is a sequence diagram illustrating a process performed when a main power supply of the image forming apparatus is turned off while a power state of the image forming apparatus is set to a normal mode.

FIG. 3 is a sequence diagram illustrating a process performed when the main power supply 400 of the image forming apparatus 1 is turned off while the power state is set to the normal mode. When the user presses down the power switch 410, the power switch 410 outputs information that represents the power is off to the controller 100 (Step S200). Subsequently, in the controller 100, the system control unit 101 outputs a power-off request to the engine unit 300 (Step S201). The system control unit 101 also outputs the power-off request to the operation and display unit 200 (Step S202).

In the normal mode, the system control unit 101 writes the engine information that has been read out from the engine storage device 310 through the engine unit 300 and obtained in the information notifying process (Step S105) described above with reference to FIG. 2, to the controller storage device 110 (Step S203). Likewise, in the normal mode, the system control unit 101 writes the display information that has been read out from the display information storage device 210 through the operation and display unit 200 and obtained in the information notifying process (Step S109) described above with reference to FIG. 2, to the controller storage device 110 (Step S203). The system control unit 101 also writes the controller information that has been used by the controller to the controller storage device 110 (Step S203).

In the engine unit 300, when the power-off request is obtained (Step S201), the engine control unit 302 performs a process to turn off the power of the engine unit 300 and the engine storage device 310 (Step S210). After the process to turn off the power ends, the engine control unit 302 outputs a completion notification of the power off to the controller 100 (Step S211). Likewise, in the operation and display unit 200, when the power-off request is obtained (Step S202), the operation and display control unit 203 performs a process to turn off the power of the operation and display unit 200 and the display information storage device 210 (Step S212). After the process to turn off the power ends, the operation and display control unit 203 outputs the completion notification of the power off to the controller 100 (Step S213).

After the system control unit 101 in the controller 100 has completed writing the display information, the engine information, and the controller information to the controller storage device 110 and has received the completion notification of the power off from the operation and display unit 200 and the engine unit 300, the system control unit 101 turns off the power of the controller 100 (Step S214). This is the end of the process of the image forming apparatus 1 while the main power supply 400 is turned off.

As described above, in the image forming apparatus 1 according to the embodiment, not only the controller information that should be stored in the controller storage device 110 primarily, but also the display information and the engine information are stored in the controller storage device 110 while the main power supply 400 is turned off.

Figure 4:
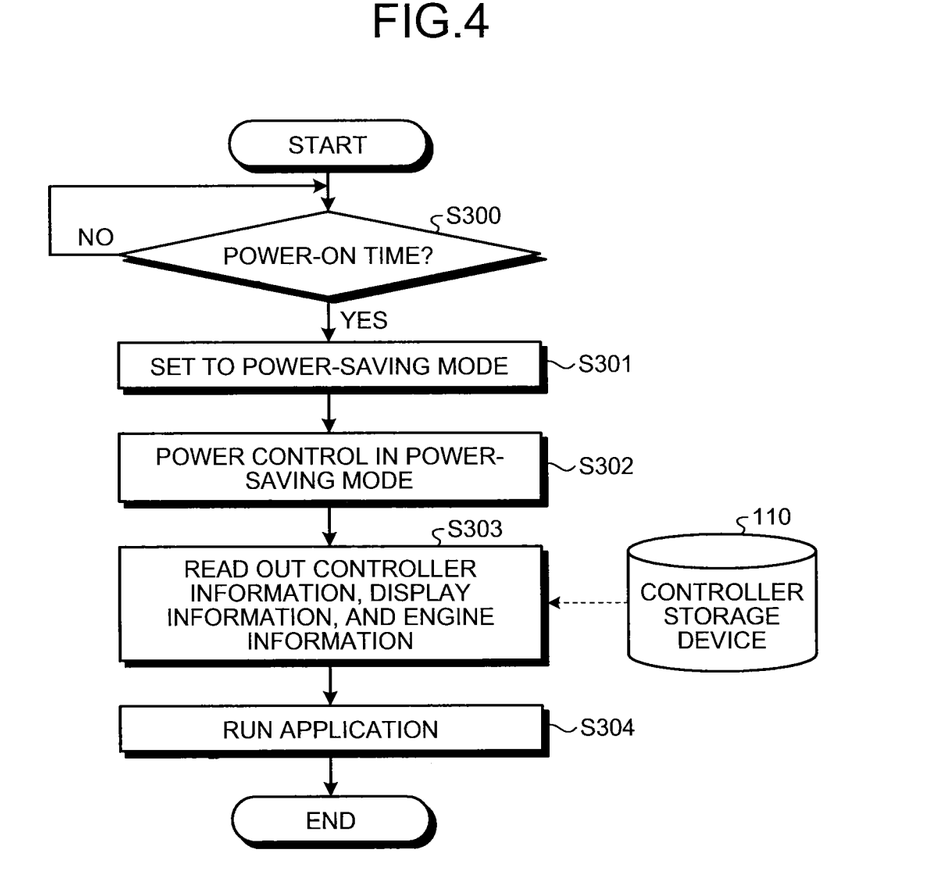

FIG. 4 is a flowchart illustrating a process performed when the image forming apparatus 1 is automatically turned on by the timer function 105. When the timer function 105 of the controller 100 detects the power-on time (Yes at Step S300), the state management unit 102 of the controller 100 sets the power state to the power-saving mode (Step S301). Then, the power control unit 103 performs power control in the power-saving mode (Step S302). Specifically, the power control unit 103 starts supplying power from the main power supply 400 to the controller 100 and the controller storage device 110. The power control unit 103 does not supply power to the operation and display unit 200, the display information storage device 210, the engine unit 300, and the engine storage device 310.

Subsequently, the system control unit 101 reads out the information used for the application 104 from the controller storage device 110 (Step S303). Specifically, the system control unit 101 reads out at least one of the controller information, the display information, and the engine information, and outputs this information to the application 104.

The system control unit 101 outputs the display information or the engine information along with unconfirmed information representing that the display information or the engine information to be output is temporary information that has not been actually read out from the display information storage device 210 or the engine storage device 310. In addition, the system control unit 101 outputs the controller information along with confirmed information representing that the controller information to be output is proper information. As a result, the application 104 can recognize whether the obtained information is confirmed information, in other words, whether the obtained information is the temporary information to run the application.

Subsequently, the application 104 performs a process using the information that has been read out from the controller storage device 110 by the system control unit 101 at Step S303 (Step S304). This is the end of the process of the image forming apparatus 1 that has been automatically turned on.

As described above, the image forming apparatus 1 that has been turned on automatically is set directly to the power-saving mode without even being set to the normal mode. In other words, in the image forming apparatus 1 that has been automatically turned on, only the controller 100 and the controller storage device 110 can be supplied with power without supplying power to the operation and display unit 200, the display information storage device 210, the engine unit 300, and the engine storage device 310.

Furthermore, the engine information or the display information required for the application 104 of the controller 100 to perform the process has been written to the controller storage device 110 while the main power supply 400 of the image forming apparatus 1 is turned off. Therefore, when the image forming apparatus 1 is automatically turned on, the engine information that has been written to the controller storage device 110 while the main power supply 400 is turned off can be used to perform the process normally. The application 104 can perform the process normally, whereby the controller 100 can be started up without irregularities.

In the present embodiment, the engine information used by the application 104 when the image forming apparatus 1 has been automatically turned on is the engine information that has been written while the power is turned off. However, the engine information is not limited to the embodiment. The engine information to be stored in the controller storage device 110 for use by the application when the power is automatically turned on may be such information with which the application can perform the process normally. For example, the controller storage device 110 may store in advance therein any engine information as engine information used when the power is automatically turned on.

Figure 5:
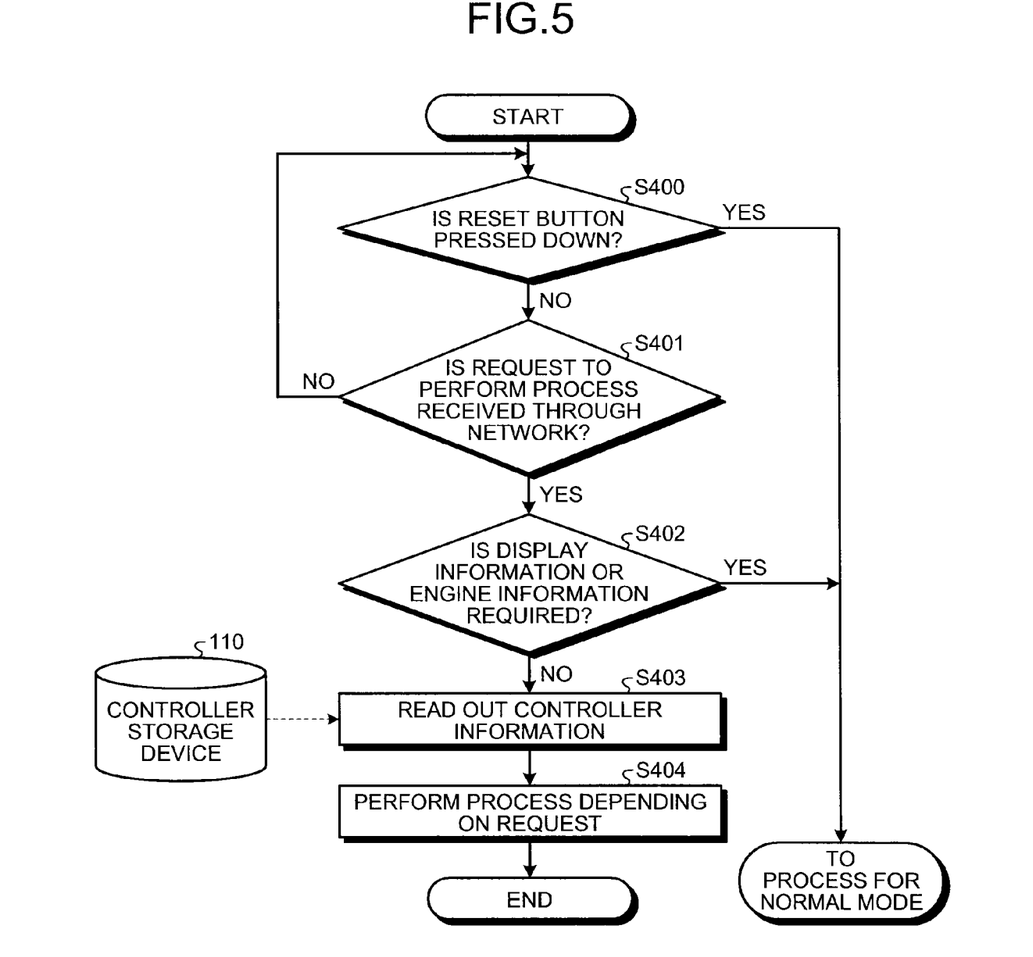
FIG. 5 is a flowchart illustrating a process performed when the image forming apparatus receives an instruction from a user in a power-saving mode.

FIG. 5 is a flowchart illustrating a process performed when the image forming apparatus 1 receives an instruction from the user and proceeds to the power-saving mode. As illustrated in FIG. 5, after the image forming apparatus 1 is automatically turned on and in the power-saving mode, when the user presses down the reset button 420 (Yes at Step S400), the image forming apparatus 1 proceeds to the normal mode process described above with reference to FIG. 2. In other words, the state management unit 102 sets the power state to the normal mode and power control is performed in the normal mode (Step S101). Then, the engine unit 300 and the operation and display unit 200 start up (Step S103, Step S107), from which the system control unit 101 obtains the engine information and the display information (Step S105, Step S109).

The application 104, which has already started up, performs the process again at Step S110, by using the engine information or the display information obtained at Step S105 or Step S109.

The application 104 has performed the process by using the engine information that has already been stored in the controller storage device 110 in the power-saving mode. However, the engine information stored in the controller storage device 110 is temporary information, which may differ from the engine information actually stored in the engine storage device 310 at the time when the reset button 420 is pressed down.

Therefore, in order to actually operate the engine 301 through processing by the application 104, the engine information stored in the engine storage device 310 is required. Then, after the power state returns to the normal mode from the power-saving mode and the operation and display unit 200, the display information storage device 210, the engine unit 300, and the engine storage device 310 are energized, the application 104 performs the process again by using the display information and the engine information obtained by the system control unit 101 from the display information storage device 210 or the engine storage device 310.

For example, when the user inputs a print instruction for inputting a print job, the printer application requires engine information such as availability of stapling, availability of duplex printing, and an available paper size. However, in the power-saving mode, the engine information as unconfirmed information (temporary information) read out form the controller storage device 110 is not the latest engine information. Accordingly, the engine information stored in the engine storage device 310 when the printer job is input and the engine information of the engine actually being used by the application do not coincide in some cases. For example, in temporary information, a tray for A4 size paper exists because an A4 size was available for printing in the power-saving mode. After that, the tray for A4 size paper has been removed, thus, the A4 size is unavailable for printing when the printer job is input.

In such a case, the image forming apparatus 1 performs a returning process to the normal mode (the normal mode process illustrated in FIG. 2). In the normal mode process, the printer application performs a process on the printer job by using the engine information stored in the engine storage device 310.

As a result, when the engine and the like actually operate, the application 104 in the controller 100 obtains the information actually stored in the engine storage device 310 or the display information storage device 210 used for a restarting operation. Therefore, the engine and the like can be operated normally in the image forming apparatus 1.

With reference to FIG. 5, when the system control unit 101 receives a request to perform a predetermined process from the user through a network (No at Step S400, Yes at Step S401), the system control unit 101 identifies the information required for the request. If at least one out of the engine information and the display information is required (Yes at Step S402), the process proceeds to the normal mode process (FIG. 2). The power control unit 103, then, energizes the operation and display unit 200, the engine unit 300, and so on in the normal mode process. After that, the system control unit 101 obtains required information from the display information storage device 210 or the engine storage device 310 through the operation and display unit 200, the engine unit 300, and so on. The system control unit 101 performs a process depending on the request by using the obtained information.

Otherwise, when the engine information or the display information is not required at Step S402 illustrated in FIG. 5, (No at Step S402), the system control unit 101 reads out the controller information from the controller storage device 110 (Step S403) to perform a process depending on the request by using the controller information (Step S404). In this case, returning to the normal mode is not required.

Furthermore, as another example, when the application is updated using a remote firmware update feature through a network, the information relating to the update may be displayed on the display unit 202 in the image forming apparatus 1. In this case, in order to display the information on the display unit 202, the power control unit 103 starts supplying power to the operation and display unit 200 and the display information storage device 210. Subsequently, the system control unit 101 of the controller 100 obtains the display information such as language information from the display information storage device 210 through the operation and display control unit 203. The system control unit 101 requests the operation and display control unit 203 to display a certain letter string on the basis of the obtained information. The display unit 202 displays information relating to the update through the processing as described above.

In the present embodiment, the image forming apparatus 1 that is automatically turned on by the timer function 105 has been described. However, the image forming apparatus 1 does not necessarily have a function to automatically turn on the power. In this case, the power state immediately after the power is turned on may be set in advance to the power-saving mode or the normal mode. For example, the power state after the power is turned on may be set depending on the input from the user. Therefore, if the power state after the power is turned on has been set to the power-saving mode, a process to set the power-saving mode may be performed after the power is turned on as described above.

In the present embodiment, the engine information and the display information, as unconfirmed information to be read out from the controller storage device 110 if the power-saving mode is set immediately after the main power supply 400 is turned on, is such information that has been stored in the controller storage device 110 by the system control unit 101 at the latest power-off of timing of the main power supply 400. However, the embodiment is not limited to this example. The engine information and the display information stored in the controller storage device 110 as unconfirmed information may be such information that is used for the application 104 to perform a process normally in the power-saving mode. For example, the controller storage device 110 may store therein any information as unconfirmed information in advance.

Figure 6:
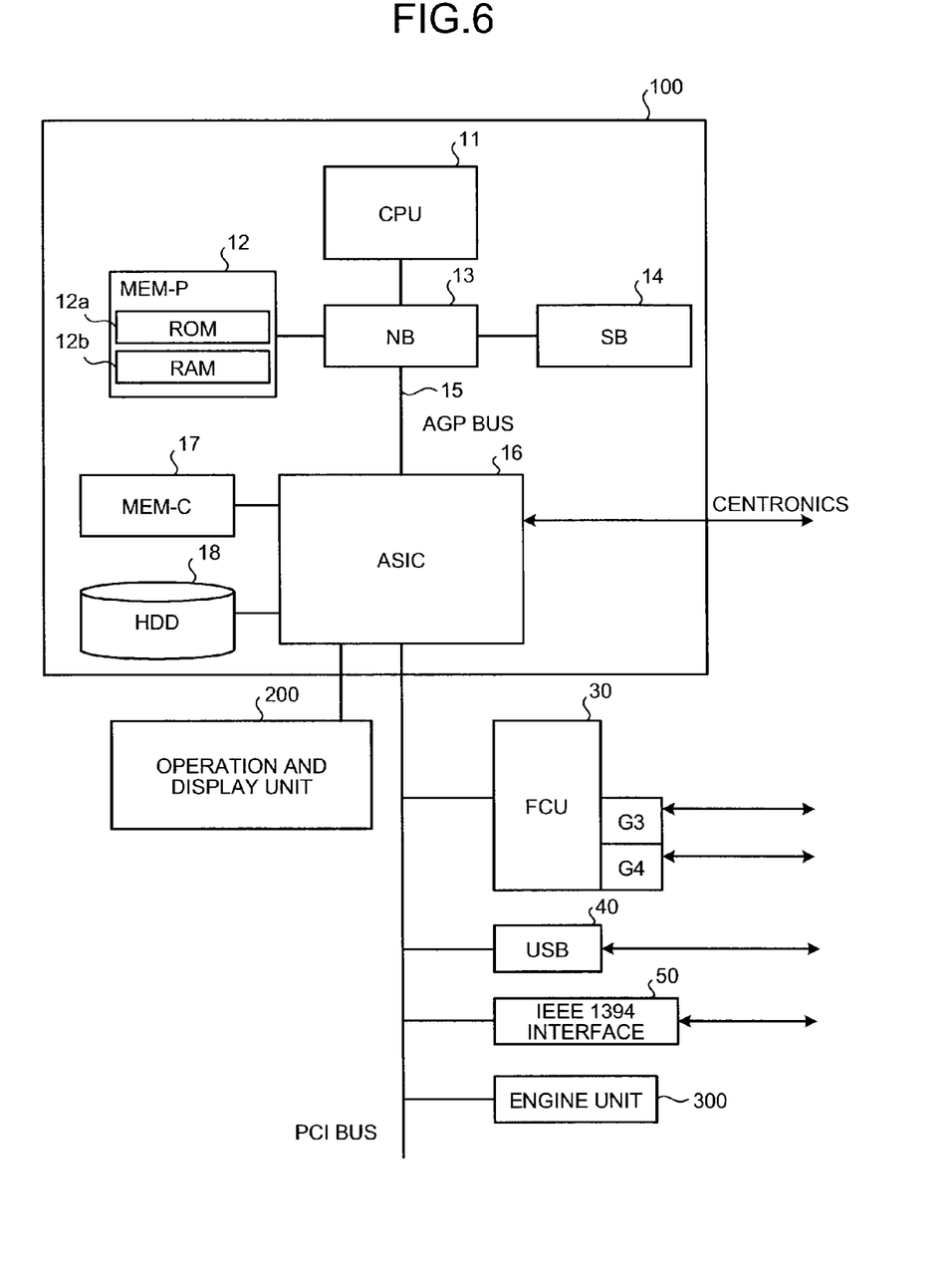
FIG. 6 is a block diagram illustrating a hardware configuration of a multifunction peripheral (MFP) as an example of the image forming apparatus according to the embodiment.

FIG. 6 is a block diagram illustrating a hardware configuration of a multifunction peripheral (MFP) as an example of the image forming apparatus according to the embodiment of the present invention. As illustrated in FIG. 6, the MFP is configured so that the controller 100 and the engine unit (engine) 300 are coupled to each other through a peripheral component interface (PCI) bus. The controller 100 is a controller that controls the whole of the MFP, printing, communications, and an input from an operation unit (not illustrated). The engine 301 is a printer engine, for example, that can be coupled to the PCI bus, such as a monochrome plotter, a one-drum color plotter, a four-drum color plotter, a scanner, or a facsimile unit. The engine unit 300 includes an image processing unit that performs error diffusion or gamma conversion, for example, in addition to an engine unit such as a plotter.

The controller 100 includes a CPU 11, a north bridge (NB) 13, a system memory (MEM-P) 12, a south bridge (SB) 14, a local memory (MEM-C) 17, an application specific integrated circuit (ASIC) 16, and a hard disc drive (HDD) 18. The north bridge (NB) 13 and the ASIC 16 are coupled to each other through an accelerated graphics port (AGP) bus 15. The MEM-P 12 further includes a read only memory (ROM) 12*a* and a random access memory (RAM) 12*b*.

The CPU 11 controls the whole of the MFP and has a chipset including the NB 13, the MEM-P 12, and the SB 14, through which the CPU 11 is coupled to other devices.

The NB 13 is a bridge to couple the CPU 11, the MEM-P 12, the SB 14, and the AGP bus 15 to each other. The NB 13 has a memory controller that controls reading out or writing to the MEM-P 12, and a PCI master and an AGP target.

The MEM-P 12 is a system memory used as a memory for storing programs or data, a memory for loading programs or data, a memory for drawing images for printing, for example. The MEM-P 12 includes the ROM 12*a* and the RAM 12*b*. The ROM 12*a* is a read only memory used for storing programs or data. The RAM 12*b* is a readable and writable memory used as the memory for loading programs or data, or the memory for drawing images for printing.

The SB 14 is a bridge to couple the NB 13, a PCI device, and a periphery device to each other. The SB 14 is coupled to the NB 13 through the PCI bus, to which a network interface (I/F) unit or the like is also coupled.

The ASIC 16 is an integrated circuit (IC) for image processing use having a hardware component for image processing. The ASIC 16 has a role of a bridge that couples the AGP bus 15, the PCI bus, the HDD 18, and the MEM-C 17 to each other. The ASIC 16 includes a PCI target and an AGP master, an arbiter (ARB) that is a core of the ASIC 16, a memory controller that controls the MEM-C 17, a plurality of direct memory access controllers (DMAC), and a PCI unit. The DMAC rotates image data, for example, by using hardware logic. The PCI unit transmits data between the ASIC 16 and the engine unit 300. To the ASIC 16, a facsimile control unit (FCU) 30, a universal serial bus (USB) 40, an institute of electrical and electronics engineers 1394 (IEEE 1394) interface 50 are coupled through the PCI bus. The operation and display unit 200 is directly coupled to the ASIC 16.

The MEM-C 17 is a local memory used as an image buffer for copying or a code buffer. The hard disk drive (HDD) 18 is a storage unit to accumulate therein image data, programs, font data, and forms.

The AGP bus 15 is a bus interface for a graphics accelerator card that is proposed to accelerate graphics processing. The AGP bus 15 directly accesses the MEM-P 12 with high-throughput to speed up the graphics accelerator card.

The image forming apparatus according to the embodiment can be applied to any one of an MFP having two or more functions of copying, printing, scanning, and facsimile transmission, a copying machine, a printer, a scanner, a facsimile machine, and other image forming apparatuses.

According to the embodiment, it is possible to enjoy advantageous effects in that the power consumption of the image forming apparatus can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus for forming an image, the image forming apparatus comprising:
    an engine configured to perform an operation involving image formation;
    an engine control unit configured to control the engine;
    a first storage unit configured to be accessible by the engine control unit and store therein first engine information that represents a configuration of the engine;
    an apparatus control unit configured to control the whole of the image forming apparatus;
    a second storage unit configured to be accessible by the apparatus control unit and store therein second engine information that represents a configuration of the engine;
    a state management unit configured to set the image forming apparatus to a power-saving mode in which the apparatus control unit and the second storage unit are supplied with power while the engine, the engine control unit, and the first storage unit are not supplied with power when a main power supply that supplies the power is turned on, and
    a receiving unit that receives an instruction for turning off the main power supply, wherein
    when the image forming apparatus is set to the power-saving mode, the apparatus control unit reads out the second engine information stored in the second storage unit and runs an application involving image formation on the basis of the second engine information to perform a start-up process on the apparatus control unit, and
    when the receiving unit receives the instruction for turning off the main power supply, the apparatus control unit writes the first engine information stored in the first storage unit to the second storage unit as the second engine information.

2. The image forming apparatus according to claim 1, wherein the receiving unit configured to receive an instruction for setting the image forming apparatus to a normal mode in which the receiving unit, the engine, the engine control unit, the apparatus control unit, the first storage unit, and the second storage unit are supplied with the power,
    the state management unit sets the image forming apparatus to the normal mode in response to the instruction received by the receiving unit,
    the receiving unit receives the instruction for turning off the main power supply while the image forming apparatus is in the normal mode, and
    the image forming apparatus further comprises a power supply control unit configured to stop supplying power to the first storage unit after the apparatus control unit writes the second engine information to the second storage unit.

3. The image forming apparatus according to claim 2, wherein
    when the image forming apparatus is changed from the power-saving mode to the normal mode, the apparatus control unit instructs the engine control unit to read out the first engine information stored in the first storage unit and runs the application again on the basis of the first engine information obtained through the engine control unit.

4. The image forming apparatus according to claim 2, wherein
    the second storage unit further stores therein apparatus information relating to the image forming apparatus, the apparatus information being referred to by the apparatus control unit,
    the receiving unit further receives an instruction for performing a predetermined process while the image forming apparatus is in the power-saving mode, and
    the apparatus control unit identifies information required to perform the predetermined process on the basis of the received instruction, and
    when the apparatus control unit identifies the apparatus information as the information required to perform the predetermined process, the apparatus control unit performs the predetermined process on the basis of the apparatus information stored in the second storage unit.

5. The image forming apparatus according to claim 4, wherein
    when the apparatus control unit identifies the engine information as the information required to perform the predetermined process, the state management unit sets the image forming apparatus to the normal mode, and
    the apparatus control unit instructs the engine control unit to read out the first engine information stored in the first storage unit and performs the predetermined process on the basis of the first engine information obtained through the engine control unit.

6. The image forming apparatus according to claim 1, wherein
    the first engine information and the second engine information includes at least one of a version of engine software of the engine, information on a tray type of the image forming apparatus, information on a finisher type of the image forming apparatus, information on magnification/reduction rate of a scanner engine of the image forming apparatus, and information on image resolution of the scanner engine.

7. An image forming apparatus for forming an image, the image forming apparatus comprising:
    an engine configured to perform an operation involving image formation;

an engine control unit configured to control the engine;
a first storage unit configured to be accessible by the engine control unit and store therein first engine information that represents a configuration of the engine;
an apparatus control unit configured to control the whole of the image forming apparatus;
a second storage unit configured to be accessible by the apparatus control unit and store therein second engine information that represents a configuration of the engine; and
a state management unit configured to set the image forming apparatus to a power-saving mode in which the apparatus control unit and the second storage unit are supplied with power while the engine, the engine control unit, and the first storage unit are not supplied with power when a main power supply that supplies the power is turned on, wherein
when the image forming apparatus is set to the power-saving mode, the apparatus control unit reads out the second engine information stored in the second storage unit and runs an application involving image formation on the basis of the second engine information to perform a start-up process on the apparatus control unit, and the image forming apparatus comprising:
a display control unit configured to control a display unit; and
a third storage unit configured to be accessible by the display control unit and store therein first display information to be displayed on the display unit, wherein
the second storage unit further stores therein second display information to be displayed on the display unit, and
when the image forming apparatus is set to the power-saving mode, the apparatus control unit further reads out the second display information stored in the second storage unit and performs a start-up process on the apparatus control unit by running the application on the basis of the second display information.

8. The image forming apparatus according to claim 7, wherein
when the image forming apparatus is changed from the power-saving mode to a normal mode in which the receiving unit, the engine, the engine control unit, the apparatus control unit, the first storage unit, the second storage unit, the display control unit and the third storage unit are supplied with the power, the apparatus control unit instructs the display control unit to read out the first display information stored in the third storage unit and runs the application again on the basis of the first display information obtained through the display control unit.

9. The image forming apparatus according to claim 8, wherein
the second storage unit further stores therein apparatus information referred to by the apparatus control unit,
the receiving unit further receives an instruction for performing a predetermined process while the image forming apparatus is in the power-saving mode,
the apparatus control unit identifies the display information as the information required to perform the predetermined process on the basis of the received instruction,
when the apparatus control unit identifies the display information, the state management unit sets the image forming apparatus to the normal mode, and
the apparatus control unit instructs the display control unit to read out the first display information stored in the third storage unit and performs the predetermined process on the basis of the first display information obtained through the display control unit.

10. An image forming method performed in an image forming apparatus that includes an engine configured to perform an operation involving image formation, an engine control unit configured to control the engine, a first storage unit configured to be accessible by the engine control unit and store therein first engine information that represents a configuration of the engine, an apparatus control unit configured to control the whole of the image forming apparatus, and a second storage unit configured to be accessible by the apparatus control unit and store therein second engine information that represents a configuration of the engine, the image forming method comprising:
setting the image forming apparatus to a power-saving mode in which the apparatus control unit and the second storage unit are supplied with power while the engine, the engine control unit, and the first storage unit are not supplied with power when a main power supply that supplies the power is turned on;
receiving an instruction for turning off the main power supply;
reading out, when the image forming apparatus is set to the power-saving mode, the second engine information stored in the second storage unit;
running an application involving image formation on the basis of the read second engine information to perform a start-up process on the apparatus control unit; and
writing the first engine information stored in the first storage unit to the second storage unit as the second engine information when the instruction for turning off the main power supply is received.

11. The image forming method according to claim 10, further comprising:
receiving an instruction for setting the image forming apparatus to a normal mode in which the engine, the engine control unit, the apparatus control unit, the first storage unit, and the second storage unit are supplied with the power, wherein the setting includes setting the image forming apparatus to the normal mode in response to the received instruction;
receiving the instruction for turning off the main power supply while the image forming apparatus is in the normal mode;
stopping supplying power to the first storage unit after the second engine information is written to the second storage unit.

12. The image forming method according to claim 11, further comprising:
instructing the engine control unit to read out the first engine information stored in the first storage unit when the image forming apparatus is changed from the power-saving mode to the normal mode; and
running the application again on the basis of the first engine information obtained through the engine control unit.

13. The image forming method according to claim 11, wherein
the second storage unit further stores therein apparatus information relating to the image forming apparatus, the apparatus information being referred to by the apparatus control unit, and
the image forming method further comprises:
receiving an instruction for performing a predetermined process while the image forming apparatus is in the power-saving mode;
identifying information required to perform the predetermined process on the basis of the received instruction; and performing, when the apparatus information is identified as the information required to perform the predetermined process, the predetermined process on the basis of the apparatus information stored in the second storage unit.

14. The image forming method according to claim 13, further comprising:
setting the image forming apparatus to the normal mode when the engine information is identified as the information required to perform the predetermined process;
instructing the engine control unit to read out the first engine information stored in the first storage unit; and
performing the predetermined process on the basis of the first engine information obtained through the engine control unit.

15. The image forming method according to claim 10, wherein
the first engine information and the second engine information includes at least one of a version of engine software of the engine, information on a tray type of the image forming apparatus, information on a finisher type of the image forming apparatus, information on magnification/reduction rate of a scanner engine of the image forming apparatus, and information on image resolution of the scanner engine.

16. An image forming method performed in an image forming apparatus that includes an engine configured to perform an operation involving image formation, an engine control unit configured to control the engine, a first storage unit configured to be accessible by the engine control unit and store therein first engine information that represents a configuration of the engine, an apparatus control unit configured to control the whole of the image forming apparatus, and a second storage unit configured to be accessible by the apparatus control unit and store therein second engine information that represents a configuration of the engine, the image forming method comprising:
setting the image forming apparatus to a power-saving mode in which the apparatus control unit and the second storage unit are supplied with power while the engine, the engine control unit, and the first storage unit are not supplied with power when a main power supply that supplies the power is turned on;
reading out, when the image forming apparatus is set to the power-saving mode, the second engine information stored in the second storage unit; and
running an application involving image formation on the basis of the read second engine information to perform a start-up process on the apparatus control unit, wherein
the image forming apparatus further includes
a display control unit configured to control a display unit; and
a third storage unit configured to be accessible by the display control unit and store therein first display information to be displayed on the display unit,
the second storage unit further stores therein second display information to be displayed on the display unit, and
the image forming method further comprises:
reading out the second display information stored in the second storage unit when the image forming apparatus is set to the power-saving mode; and
performing a start-up process on the apparatus control unit by running the application on the basis of the read second display information.

17. The image forming method according to claim 16, wherein
the image forming method further comprises
instructing the display control unit to read out the first display information stored in the third storage unit when the image forming apparatus is changed from the power-saving mode to a normal mode in which the receiving unit, the engine, the engine control unit, the apparatus control unit, the first storage unit, the second storage unit, the display control unit and the third storage unit are supplied with the power; and
running the application again on the basis of the first display information obtained through the display control unit.

18. The image forming method according to claim 17, wherein
the second storage unit further stores therein apparatus information referred to by the apparatus control unit, and
the image forming method further comprises:
receiving an instruction for performing a predetermined process while the image forming apparatus is in the power-saving mode;
identifying the display information as the information required to perform the predetermined process on the basis of the received instruction;
setting the image forming apparatus to the normal mode when the display information is identified;
instructing the display control unit to read out the first display information stored in the third storage unit; and
performing the predetermined process on the basis of the first display information obtained through the display control unit.

* * * * *